W. J. Hazen.
Bee Hive.
N°2,700.
33,704.
Patented Nov. 12, 1861.
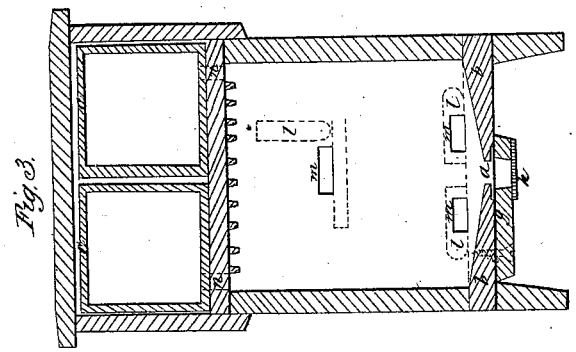
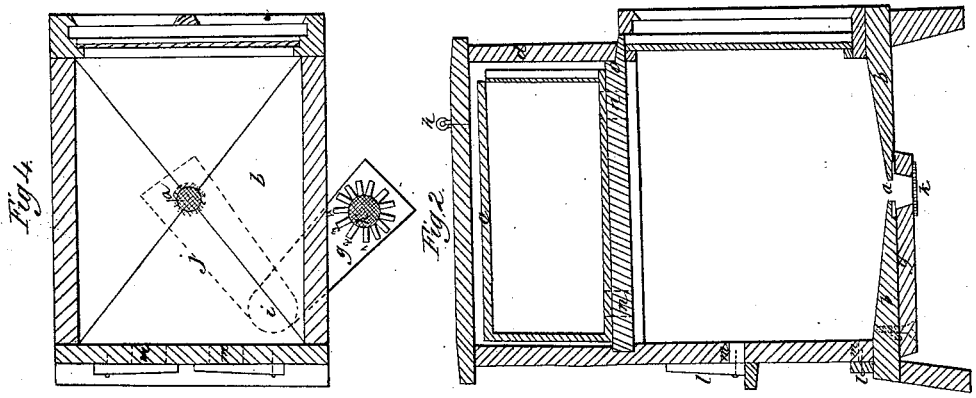
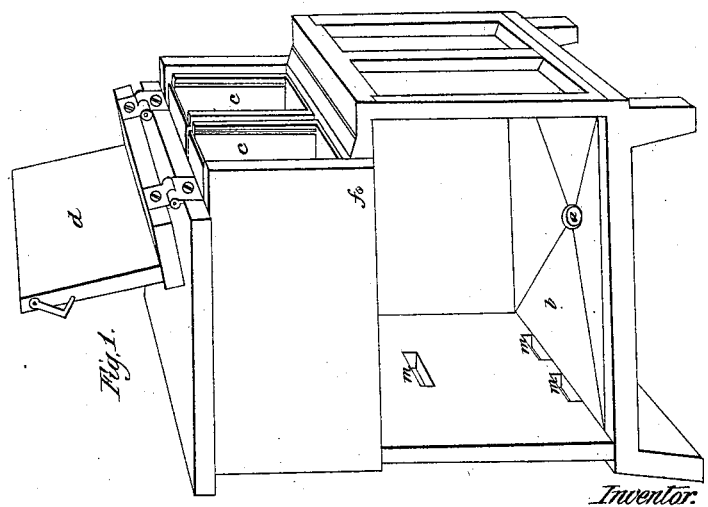
Witnesses.
Inventor:
W. J. Hazen

UNITED STATES PATENT OFFICE.

WILLIAM J. HAZEN, OF BETHANY, PENNSYLVANIA.

IMPROVEMENT IN MOTH-TRAPS FOR BEE-HIVES.

Specification forming part of Letters Patent No. 33,704, dated November 12, 1861.

*To all whom it may concern:*

Be it known that I, WILLIAM J. HAZEN, of Bethany, in the county of Wayne and State of Pennsylvania, have invented a new and useful Improvement in Moth or Worm Traps for Bee-Hives; and I do hereby declare that the following is a full and exact description thereof, reference being had to the accompanying drawings, and to the letters and figures of reference marked thereon, like letters referring to like parts.

$a$ is the hole through the bottom of the hive leading to the worm-trap.

$b$ is the bottom of the hive.

$c$ is the honey-boxes.

$d$ is the chamber-door.

$e$ is the hook which holds the door closed by being hooked to the pin $f$.

$g$ is the worm-trap.

$h$ is the hinge of the chamber-door.

$i$ is the screw which holds the worm trap to the bottom of the hive.

$j$ is the dotted line showing the right position of the worm-trap with the bottom of the hive.

$k$ is the wire-cloth forming the bottom of the worm-trap.

1, 2, 3, 4, &c., are grooves or channels cut in the top of the worm-trap.

$l$ are buttons for closing the ports through which the bees enter the hive.

$m$ are the ports through which the bees enter.

$n$ are ports leading from the body of the hive to the chamber into the honey-boxes.

O is the corner or rabbet into which the chamber-door closes.

Figure 1 is a perspective view, one side of the body of the hive being removed, showing the hole in the center of the bottom. Fig. 2 is a longitudinal elevation, Fig. 3 a transverse section, Fig. 4 a horizontal section, of the body of the hive, the dotted lines $j$ showing the right position of the worm-trap $g$ under the bottom $b$.

The bottom of the hive is so constructed that it shall form an inclined plane from all sides to the center, being the lowest at the center, as represented in the drawings. The door $d$ of the chamber of the hive is so constructed that it opens back on the top of the hive, and when closed shuts against the ends of the boards which form the sides of the chamber of the hive, and closing into a corner or rabbet, as represented at O, Fig. 2, is held to its place by the hook $e$ being hooked to the pin $f$, or by any other convenient means of fastening, thereby keeping the chamber of the hive closed tight, should the door shrink from its original size, and also that any expansion of the door shall not prevent or hinder the door being opened at any time. The worm-trap $g$ is pivoted at one end to the bottom of the hive, as shown in the drawings, and is provided near the other end with an opening the bottom of which is covered with the wire-gauze $k$, for the purpose of affording ventilation, while at the same time preventing the entrance of insects to the hive. The grooves 1, 2, 3, 4, &c., are cut in the top of the trap $g$ and radially with the opening therein. These grooves pass only partly through the slide or trap, and are of sufficient size as to admit the worms and afford them a place of escape from the bees, and also for the forming of the cocoon. The worm thus provided for will seldom, if ever, attempt to cut farther through the wood, and the miller when emerging from the cocoon will be unable to penetrate the wood in advance of it or to turn itself in the groove to cut through that part of the cocoon remaining in its rear, and will thus perish in the place in which it is hatched, thus making the trap self-acting.

The trap may be turned out and cleaned at the pleasure of the apiarian.

Having now fully described the construction and operation of my invention, what I claim as new, and desire to secure by Letters Patent, is—

The worm-trap $g$, pivoted at one end to the bottom of the hive, as described, and provided at the other end with the wire-gauze-covered opening, and the grooves 1, 2, 3, 4, &c., radiating therefrom, arranged and operating in combination with the inclined bottom of the hive, in the manner and for the purpose specified.

W. J. HAZEN.

Witnesses:
   P. G. GOODRICH,
   L. M. GOODRICH.